Patented Mar. 26, 1929.

1,706,489

UNITED STATES PATENT OFFICE.

ERWIN HOFFA AND PAUL JÖRG, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS FOR PREPARING AROMATIC MERCAPTANS.

No Drawing. Application filed September 21, 1927, Serial No. 221,135, and in Germany October 18, 1926.

Our present invention relates to a new method of preparing aromatic mercaptans.

Hitherto no process has been known by which it is possible to prepare mercaptans of the general formula: R.SH (wherein R means a non-substituted or substituted benzene- or naphthalene residue) with a yield adequate for technical purposes, by causing diazoaryles to act upon metal disulfides and subjecting to reduction the aryldisulfides thus produced having the general formula: R.S.S.R; there being excluded from the said diazoaryles only those which contain a solubilizing group, for instance the carboxyl group.

Now we have found that yields which are adequate for technical purposes can be obtained also from diazoaryles containing no solubilizing group, by causing the diazoaryles to act upon higher sulfurized metals instead of metal disulfides and subjecting the products of the reaction to reduction. The metal sulfides in question must contain a higher percentage of sulfur than corresponds to the formula $Me_2S_2$ wherein "Me" stands for one equivalent of a metal, for instance more than $Na_2S_2$ or $CaS_2$. The action of the dissolved diazo compounds upon the metal sulfides advantageously takes place at temperatures not considerably below 60° C., since explosive diazo sulfides can be formed at lower temperatures; the upper limit of temperature is the boiling point of the aqueous sulfide solution, i. e., about 100° C.

The addition of an alkali, for instance a carbonate, bicarbonate, alkali silicate, or of catalytically acting metals or metal compounds (copper, copper salts) very often causes an increase of the yields.

The following examples serve to illustrate our invention, but they are not intended to limit it thereto, the parts being parts by weight:

(1). 56,4 parts of 5-chlor-2-amino-1-methylbenzene are mixed and stirred with 120 parts by volume of concentrated hydrochloric acid of specific gravity 1.19 and 400 parts of water and the mixture is then diazotized in the usual manner at 0°–5° C. with a concentrated aqueous solution of 28 parts of sodium nitrite. The diazo solution is mixed at 0° C.–5° C. with a caustic soda solution until its reaction towards Congo red has disappeared and is then run, while stirring, into a poly-sulfide solution, kept at a temperature of 65° C. to 70° C. which has been obtained by dissolving 44,8 parts of sulfur in 96 parts of crystallized sodium sulfide and 400 parts of water. The mass is stirred for half an hour and there are then added 48 parts of sodium sulfide in order to dissolve any sulfur which may have been separated, whereupon the whole is stirred for another 1–2 hours. The oil which, after cooling, is separated can be reduced in the usual manner so as to yield mercaptan of the following formula:

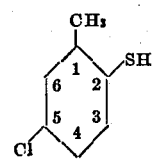

The latter may be converted without any previous purification into the corresponding arylthioglycollic acid by the action of chloroacetic acid.

(2). 56,4 parts of 5-chlor-2-amino-1-methylbenzene are diazotized in the manner indicated in Example 1. The diazo solution, after being neutralized by means of a caustic soda solution, is run, while stirring it, into a polysulfide solution having a temperature of about 65° C. to about 70° C. and being prepared by boiling for 3 hours on the reflux condenser 28.8 parts of commercial calcium sulfide, 60 parts of sulfur and 400 parts of water and then filtering the mass. The resulting mass is then worked up as indicated in Example 1.

(3). A diazo solution, prepared according to Example 1 from 56,4 parts of 5-chlor-2-amino-1-methylbenzene and neutralized by means of a caustic soda solution, is run at 60° C.–70° C. into a polysulfide solution obtained from 96 parts of sodium sulfide cryst., 48 parts of sulfur and 400 parts of water and to which 30 parts of sodium carbonate and a concentrated solution of one part of copper sulfate have been added. The resulting product is then further worked up as indicated in Example 1. In the following claims we understand by the term "copper-catalyst" metallic copper as well as copper compounds.

We claim:

1. The process for preparing aromatic mercaptans of the general formula: R—SH wherein R stands for a substituted or non-substituted aromatic residue, which consists in causing any aqueous diazoaryl solution and a metal compound containing more sulfur than corresponds to the formula $Me_2S_2$ wherein "Me" stands for one equivalent of a metal to act upon each other at a temperature between 60° C. and 100° C. and reducing the reaction products thus obtained.

2. The process for preparing aromatic mercaptans of the general formula: R—SH wherein R stands for a substituted or non-substituted aromatic residue, which consists in causing any aqueous diazoaryl solution and a metal compound containing more sulfur than corresponds to the formula $Me_2S_2$ wherein "Me" stands for one equivalent of a metal to act upon each other at a temperature between 65° C. and 70° C. and reducing the reaction products thus obtained.

3. The process for preparing aromatic mercaptans of the general formula: R—SH wherein R stands for a substituted or non-substituted aromatic residue, which consists in causing any aqueous diazoaryl solution and a metal compound containing more sulfur than corresponds to the formula $Me_2S_2$ wherein "Me" stands for one equivalent of a metal with the addition of an alkali to act upon each other at a temperature between 60° C. and 100° C. and reducing the reaction products thus obtained.

4. The process for preparing aromatic mercaptans of the general formula: R—SH wherein R stands for a substituted or non-substituted aromatic residue, which consists in causing any aqueous diazoaryl solution and a metal compound containing more sulfur than corresponds to the formula $Me_2S_2$ wherein "Me" stands for one equivalent of a metal with the addition of an alkali and a copper catalyst to act upon each other at a temperature between 60° C. and 100° C. and reducing the reaction products thus obtained.

5. The process for preparing aromatic mercaptans of the general formula: R—SH wherein R stands for a substituted or non-substituted aromatic residue, which consists in causing any aqueous diazoaryl solution and $Na_2S_{4½}$ to act upon each other at a temperature between 60° C. and 100° C. and reducing the reaction products thus obtained.

6. The process for preparing aromatic mercaptans of the general formula: R—SH wherein R stands for a substituted or non-substituted aromatic residue, which consists in causing any aqueous diazoaryl solution and $Na_2S_{4½}$ to act upon each other at a temperature between 65° C. and 70° C. and reducing the reaction products thus obtained.

7. The process for preparing aromatic mercaptans of the general formula: R—SH wherein R stands for a substituted or non-substituted aromatic residue, which consists in causing any aqueous diazoaryl solution and $Na_2S_{4½}$ with the addition of an alkali to act upon each other at a temperature between 60° C. and 100° C. and reducing the reaction products thus obtained.

8. The process for preparing aromatic mercaptans of the general formula: R—SH wherein R stands for a substituted or non-substituted aromatic residue, which consists in causing any aqueous diazoaryl solution and $Na_2S_{4½}$ with the addition of an alkali and a copper catalyst to act upon each other at a temperature between 60° C. and 100° C. and reducing the reaction products thus obtained.

9. The process for preparing a mercaptan of the following formula:

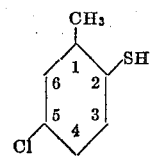

which consists in causing an aqueous solution of the diazotized 5-chlor-2-amino-1-methylbenzene and $Na_2S_{4½}$ to act upon each other at a temperature between 60° C and 100° C. and reducing the reaction products thus obtained.

10. The process for preparing a mercaptan of the following formula:

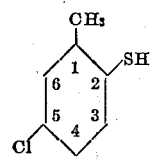

which consists in causing an aqueous solution of the diazotized 5-chlor-2-toluidine and $Na_2S_{4½}$ to act upon each other at a temperature between 65° C. and 70° C. and reducing the reaction products thus obtained.

11. The process for preparing a mercaptan of the following formula:

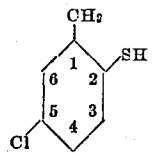

which consists in causing an aqueous solution of the diazotized 5-chlor-2-toluidine and $Na_2S_{4½}$ with the addition of an alkali to act upon each other at a temperature between 60° C. and 100° C. and reducing the reaction products thus obtained.

12. The process for preparing a mercaptan of the following formula:

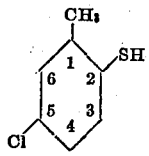

which consists in causing an aqueous solution of the diazotized 5-chlor-2-toluidine and $Na_2S_{4½}$ with the addition of an alkali and a copper catalyst to act upon each other at a temperature between 60° C. and 100° C. and reducing the reaction products thus obtained.

13. The process for preparing a mercaptan of the following formula:

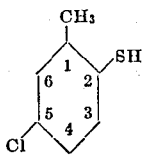

which consists in causing an aqueous solution of the diazotized 5-chlor-2-toluidine and $Na_2S_{4½}$ with the addition of sodium carbonate and copper sulfate to act upon each other at a temperature between 65° C. and 70° C. and reducing the reaction products thus obtained.

In testimony whereof, we affix our signatures.

ERWIN HOFFA.
PAUL JÖRG.